April 2, 1968 J. P. FORD 3,376,549

MAGNETIC TAPE SIGNAL QUANTIZER

Filed June 15, 1961

INVENTOR.
JOHN P. FORD

BY

Ernest L. Brown

ATTORNEY

United States Patent Office 3,376,549
Patented Apr. 2, 1968

3,376,549
MAGNETIC TAPE SIGNAL QUANTIZER

John P. Ford, Canoga Park, Calif., assignor to North American Rockwell Corporation, a corporation of Delaware Filed June 15, 1961, Ser. No. 117,201
9 Claims. (Cl. 340—172.5)

Figures 1, 2:
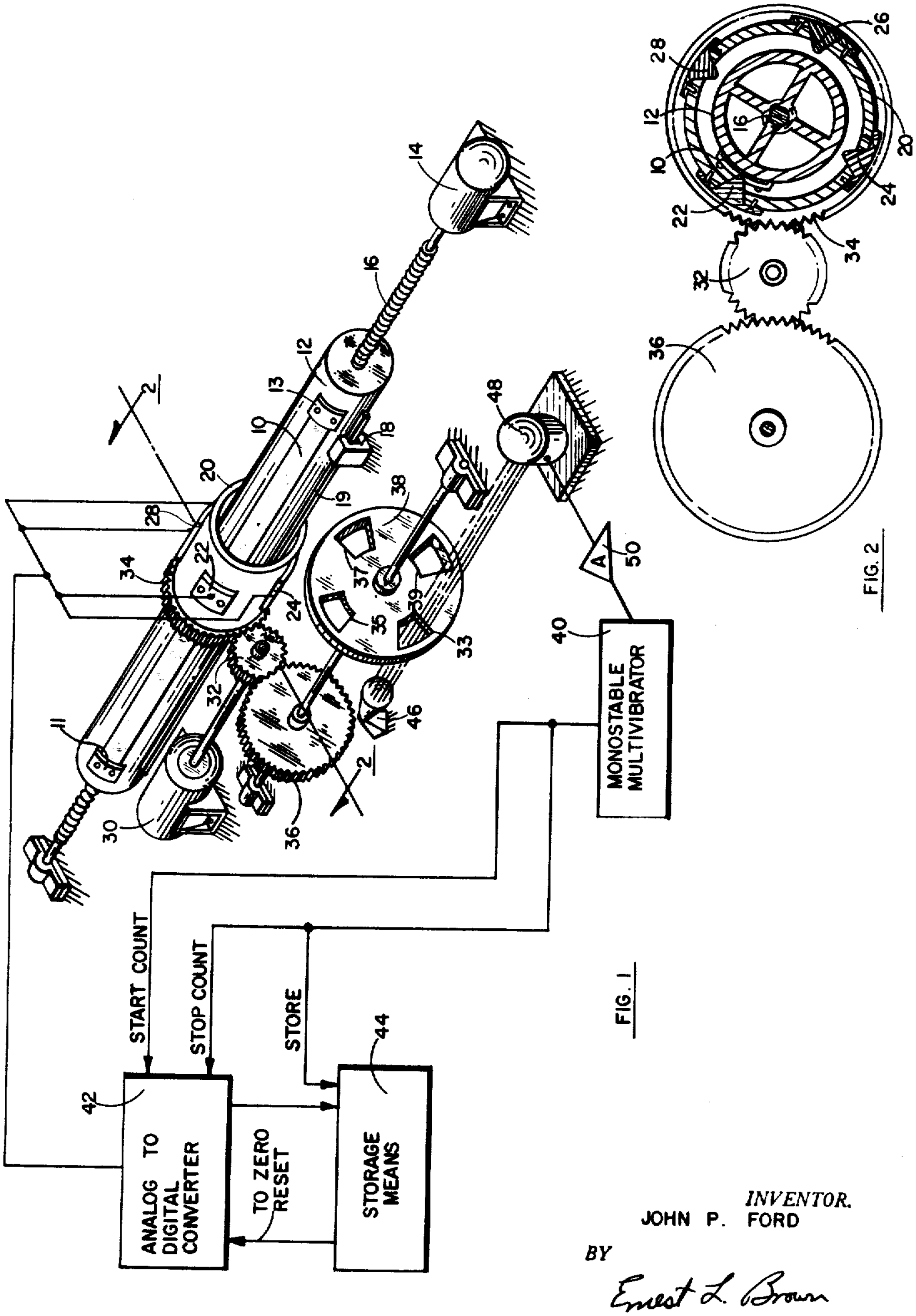

This invention pertains to means for quantizing a signal which is magnetically recorded along the length of a tape. More particularly, this invention utilizes magnetic transcribing means adapted to transcribe across the width of a tape upon which signals have been magnetically recorded along the length thereof.

In scientific and engineering experiments, it is frequently desirable that a record be made of the output of the instruments used in the experiments. For example, when a rocket engine is test-fired it is desirable to record, as a function of time, the thrust of the rocket engine.

To analyze the results of a scientific or engineering experiment it is frequently desirable to use a digital computer. To use a digital computer, the recorded information must be quantized and changed to digital form.

To facilitate changing the information to digital form it may be desirable first to record the information on magnetic tape. When the information is recorded on a magnetic tape it has heretofore been difficult accurately to quantize the information.

The device of this invention is adapted to accurately quantize the information which is magnetically recorded along the length of a tape. The tape, for example, may be of plastic with ferro-magnetic particles contained therein, or, alternatively, it may be of ferro-magnetic material and adapted to receive recorded information.

It is thus an object of this invention to quantize the data which is magnetically stored along the length of a tape.

It is another object of this invention to quantize the data which is magnetically stored along the length of a tape, to convert the quantized data to digital form, and to store it.

It is a more particular object of this invention to quantize the data which is magnetically stored along the length of a tape by utilizing magnetic transcribing devices which are adapted to transcribe across the width of the tape.

Other objects will become apparent from the following description taken in connection with the accompanying drawings in which:

FIG. 1 is a perspective view of a typical embodiment of this invention, together with schematic electrical connections; and FIG. 2 is a view, partially in profile and partially in section taken at 2—2 in FIG. 1.

One typical structure which may be used to achieve the objects of this invention is shown in the figures. A magnetic tape 10 is precisely positioned to be indexed along its length. A plurality of magnetic transcribers 22, 24, 26 and 28 are adapted to sweep across the width of tape 10 to transcribe consecutive quanta of information from tape 10. The information is transferred to an analog to digital converter 42. The information is stored in digital form by storage means 44.

A tape support member 12 is adapted to support tape 10 in precise position. Tape 10 is preferably positioned with a predetermined amount of tension and supported along its length. In FIG. 1 it is to be noted that tape support member 12 is cylindrically shaped to support tape 10 along its length. A pair of tape clamps 11 and 13 attach tape 10 to support 12 in precisely known position and tension. Additional tape (not shown) may be positioned upon tape support 12 parallel to tape 10.

Tape support 12 and tape 10 are adapted to be moved in the direction parallel to the length of tape 10. Tape support 12 is prevented from rotating by slider 18 engaging key member 19. Motor means 14 turns screw means 16 which engages tape support 12 to cause tape support 12 and tape 10 to translate in a direction parallel to the axis of screw means 16 and the length of tape 10.

Magnetic transcribers 22, 24, 26, and 28 are adapted and positioned to move across the width of tape 10. A rotatable transcriber support means 20 is concentrically positioned relative to the axis of tape support cylinder 12 to cause magnetic transcribers 22, 24, 26 and 28 to sweep across the width of tape 10. Transcriber support means 20 is adapted to rotate in and is supported by bearings (not shown). Although four transcribers are shown, it is to be stressed that only one is needed and that more than four may be used. Rotatable member 20 is driven, through gears 32 and 34, by motor 30.

To the end of converting the readings of transcribers 22, 24, 26, and 28, these transcribers are connected to the input of analog to digital converter 42.

A switching means such as, for example, a light chopper 38 is adapted to control, by means of monostable multivibrator 40, an analog to digital converter 42 and a storage means 44. A light chopper 38, driven by motor 30 through gears 32 and 36 is positioned in the light beam from light source 46 to photosensing means 48. The electrical output of photosensing means 48 is connected through an amplifier 50 to control monostable multivibrator 40. Monostable multivibrator 40 is adapted to channel control pulses to analog to digital converter 42 and to storage means 44. It is to be noted that other switching means (for example, a microswitch) might be used but that a light chopper is very satisfactory because of its high order of accuracy. The position of the windows 33, 35, 37, and 39 are such that multivibrator 40 is controlled to cause analog to digital converter 42 to convert only during a restricted time duration when one of transcribers 22, 24, 26, or 28 is passing across the width of tape 10. Further, the switching is synchronized by adjusting the angular position of chopper 38 to cause converter 42 to transfer information to storage means 44 at the end of a sweep of one of transcribers 22, 24, 26, or 28 across tape 10 and to reset converter 42 to zero when the reading on converter 42 is stored by storage means 44.

Amplifier 50, monostable multivibrator 40 and converter 42 may be constructed in accordance with known art. Frequently analog to digital converter 42 is called a digital voltmeter.

Storage means 44 may be, for example, means for consecutively punching cards or tape. Alternatively, storage means 44 may be, for example, a magnetic storage disc, drum, or tape.

In operation, an analog signal is recorded along the length of tape 10. Tape 10 is precisely positioned upon the exterior of tape support 12 and is clamped in position by tape clamps 11 and 13. Preferably, motor 14 and motor 30 are started at the same time or provision is made to compensate for lack of synchronism between motors 14 and 30. Motors 14 and 30 may, if desired, be the same motor with appropriate mechanical linkage. Motor 14 and screw means 16 translate tape support 12 and tape 10 in a direction parallel to the length of tape 10. Motor 30 rotates transcriber support means 20 and transcribers 22, 24, 26, and 28 around the circumference of cylindrical tape support 12 to cause transcribers 22, 24, 26, and 28 consecutively to sweep across the width of tape 10. Because of the translation of tape 10, the relative motion between tape 10 and transcribers 22, 24, 26, and 28 has a component in the direction of the length of tape 10. The speed of translation of tape 10 is preferably very slow to cause the component of relative motion in the direction of the length of tape 10 to be very small compared to the component of motion across the width of tape 10. The speed of translation of tape 10 is preferably just sufficient to cause the next succeeding transcriber 22, 24, 26, and 28 to read a new signal. Thus, transcribers 22, 24, 26, and 28 consecutively read signals which are a measure of the amplitude of the signal on tape 10, quantized to facilitate conversion to digital form.

The switching means 38 is positioned and adapted to control multivibrator 40 to cause converter 42 to start converting when one of transcribers 22, 24, 26 or 28 crosses tape 10 and to stop converting when the transcriber has completed its sweep. The converter 42 then receives a "stop count" signal which causes converter 42 to transfer its converted signal to storage means 44 which has been signalled to "store." As soon as storage means 44 has stored the signal of converter 42, a "zero reset" signal is transferred from storage means 44 to converter 42 to reset converter 42 to zero and adapt it to receive a new reading of the next quantum of information.

Thus, the device of this invention is adapted precisely to quantize signals magnetically stored along the length of a tape so that they may be converted to digital form and stored for use in a digital computer.

Although the device has been shown and described in one particular embodiment, it is not intended that the invention should be limited by the above description but that the invention should be limited only by the spirit and scope of the dependent claims.

I claim:

1. In combination with a tape having analog information stored along a longitudinally extending track thereof, the combination comprising:
   a transducer; and
   means for generating a quantized output signal having an amplitude indicative of the information on one area of said track, said generating means comprising means for moving said transducer across said track.

2. In combination with a tape having analog information stored along a longitudinally-extending track thereof, the combination comprising:
   a transducer; and
   means for generating successive quantized output signals having amplitudes indicative of the information on successive longitudinally-sequentially positioned areas of said track, said generating means comprising means for moving said transducer transversely across said successive longitudinally-sequentially-positioned areas of said track.

3. In combination with a magnetic tape on which information in analog form has been recorded by motion of a writing transducer in a first direction relative to the tape, readout means comprising:
   a reading transducer; and
   means for causing said reading transducer to provide a quantized output signal having an amplitude indicative of the magnitude of a relatively small portion of the recorded analog information, said means for causing comprising means for moving the reading transducer relative to the tape in a direction substantially normal to said first direction.

4. In combination with a magnetic tape on which information in analog form has been recorded in a continuous longitudinally-extending track by motion of a writing transducer along the tape in a longitudinal direction relative to the tape;
   a plurality of reading transducers; and
   means for causing said reading transducers to provide a quantized output signal having an amplitude indicative of the magnitude of a relatively small longitudinally-positioned area of the recorded analog information, said output signals being substantially independent of relative motion of the tape and reading transducers in said writing direction, said means comprising means for transversely moving the reading transducers in sequence across the tape and track in a direction substantially normal to said longitudinal direction.

5. In combination with a tape having analog information magnetically stored along a longitudinally-extending track thereof;
   a magnetic transducer;
   means for causing said magnetic-transducer to sweep across said track to generate a quantized output signal each time said track is crossed;
   switching means, synchronized with said transducer-sweeping means, for producing a switching signal;
   an analog-to-digital converter;
   means for causing said switching signal to control said converter; and
   means for applying said quantized signal to said converter after a reset operation determined by said switching signal.

6. In combination with a tape having analog information magnetically stored along a longitudinally-extending track thereof;
   a magnetic transducer;
   means for causing said magnetic-transducer to sweep across said track and said tape to generate a quantized output signal each time said tape is crossed;
   switching means, synchronized with said transducer-sweeping means, for producing a switching signal;
   means, controlled by said switching signal for producing a control-pulse;
   an analog-to-digital converter;
   means for causing said control pulse to control said converter; and
   means for applying said quantized signal to said converter after a reset operation determined by said control pulse.

7. In combination
   means for supporting a tape having analog information magnetically stored along a longitudinally-extending track thereof;
   means for moving said tape in a direction parallel to the length thereof;
   a magnetic transducer;
   means for causing said magnetic-transducer to sweep across said tape and track in given sweep-interval to generate a quantized output signal each time said tape is crossed;
   switching means, synchronized with said transducer-sweeping means, for producing a switching signal;
   means, controlled by said switching signal for producing a control-pulse;
   an analog-to-digital converter;
   means for causing said control pulse to control said converter; and
   means for applying said quantized signal to said converter.

8. In combination
   means for supporting a tape having analog information magnetically stored in a longitudinally-extending track thereof;
   means for moving said tape in a direction parallel to the length thereof;
   a magnetic transducer;
   means for causing said magnetic-transducer to sweep across said track and said tape in given sweep-interval to generate a quantized output signal each time said tape is crossed;
   switching means, synchronized with said transducer-sweeping means, for initiating a switching signal when said transducer starts to cross said tape, and for terminating said switching signal when said transducer has completed its sweep across said tape;
   means, controlled by said switching signal, for producing a control pulse;
   an analog-to-digital converter adapted to start its count on the initiation of said control pulse, and adapted to stop its count on the termination of said control pulse; and means for applying said quantized signal to said converter.

9. In combination a cylindrical member adapted to support a tape along the outside of the longitudinal cylindrical elements thereof;

a tape, having analog information magnetically stored in a longitudinally-extending track thereof, positioned upon said longitudinal cylindrical elements;

means, comprising a lead screw, for moving said cylindrical member and said tape in a direction parallel to the length of said tape;

means, comprising magnetic-transducer means adapted to rotate around the exterior of said cylindrical member and sweep across said track and said tape, for generating a quantized output signal during the sweep-interval during which said tape is crossed, said quantized signal corresponding to the magnetism in one longitudinally-positioned area of said tape;

means for causing said transducer-means to rotate around the exterior of said cylindrical member;

switching means, comprising a light-chopping disc synchronized with said rotating means and driven thereby, for initiating a switching signal when said transducer-means starts to sweep across said tape, and for terminating said switching signal when said transducer-means has completed its sweep across said tape;

means, comprising a one-shot multivibrator controlled by said switching signal from said light-chopping means, for producing a control-pulse having a duration equal to the sweep-interval of said transducer means;

an analog-to-digital converter adapted to start its count on the initiation of said control pulse, and adapted to stop its count on the termination of said control pulse;

means for applying said quantized signal from said transducer to said converter during the counting-interval of said converter; and means, comprising a storage device adapted to receive the output from said converter, for storing the output of said converter in response to said control pulse, and for generating and transferring to said converter a zero signal when said output is stored.

References Cited

UNITED STATES PATENTS

| | | | |
|---|---|---|---|
| 2,881,416 | 4/1959 | Hosken | 340—347 |
| 2,907,997 | 10/1959 | Corwin et al. | 340—347 |
| 2,986,725 | 5/1961 | Dirks | 340—174.1 |
| 2,968,798 | 1/1961 | Drukey | 340—174.1 |
| 2,721,989 | 11/1949 | Gates et al. | 340—172.5 |
| 2,946,044 | 7/1960 | Bolgiano | 340—172.5 |
| 2,266,539 | 12/1941 | Finch | 178—14 |
| 2,907,985 | 10/1959 | Doersman | 340—173 |
| 3,007,149 | 10/1961 | Brown | 340—174.1 |
| 2,968,692 | 1/1961 | Ginsburg et al. | 179—100.2 |
| 2,961,648 | 11/1960 | Sacks et al. | 340—347 |
| 2,906,827 | 9/1959 | Gordon | 179—100.2 |

FOREIGN PATENTS

| | | |
|---|---|---|
| 669,996 | 4/1952 | Great Britain. |

ROBERT C. BAILEY, *Primary Examiner.*

MALCOLM A. MORRISON, *Examiner.*

L. S. GRODBERG, E. RONEY, P. L. BERGER, J. VANDENBURG, *Assistant Examiners.*